United States Patent [19]

Deal

[11] Patent Number: 5,039,372
[45] Date of Patent: Aug. 13, 1991

[54] COMPONENT ELEMENTS OF AN APPARATUS FOR THE MANUFACTURE OF A TIRE REINFORCEMENT

[75] Inventor: Michel Deal, Escurolles, France

[73] Assignee: Compagnie Generale des Etablissements Michelin - Michelin et Cie, Clermont-Ferrand Cedex, France

[21] Appl. No.: 381,533

[22] Filed: Jul. 18, 1989

[30] Foreign Application Priority Data

Aug. 5, 1988 [FR] France .................. 88 10770

[51] Int. Cl.⁵ .................................................. B29D 30/38
[52] U.S. Cl. ........................................ 156/397; 156/117
[58] Field of Search ............... 156/117, 397, 177, 166, 156/181, 137, 439, 440, 433, 494, 495; 152/560, 548, 533; 474/133, 136, 268

[56] References Cited

U.S. PATENT DOCUMENTS

| | | | |
|---|---|---|---|
| 2,795,135 | 6/1957 | Kremser | 474/133 X |
| 2,862,541 | 12/1958 | Brink | 156/440 X |
| 3,593,394 | 7/1971 | Bolles | 156/440 X |
| 4,052,239 | 10/1977 | Chen | 156/177 |
| 4,583,962 | 4/1986 | Bytzek et al. | 474/133 |
| 4,762,583 | 8/1988 | Kaempen | 156/173 |
| 4,795,523 | 1/1989 | Laurent et al. | 156/440 X |
| 4,801,344 | 1/1989 | Laurent et al. | 156/117 |
| 4,846,771 | 7/1989 | Kozachevsky et al. | 474/268 |

FOREIGN PATENT DOCUMENTS

| | | |
|---|---|---|
| 0009018 | 3/1980 | European Pat. Off. . |
| 1291112 | 3/1969 | Fed. Rep. of Germany . |
| 83/02749 | 8/1983 | PCT Int'l Appl. . |

Primary Examiner—Caleb Weston
Assistant Examiner—Geoffrey L. Knable
Attorney, Agent, or Firm—Brumbaugh, Graves, Donohue & Raymond

[57] ABSTRACT

The apparatus concerns the manufacture of tires having at least one reinforcement formed from a single thread. It is of the type comprising two coaxial crowns 1 of levers 2 the ends of which bear means 3 for retaining the thread and comprising means 5 for presenting the thread 4 to said retaining means 3. The presentation means 5 comprise a presentation head 50 carried by a flexible belt 55 mounted on two guide pulleys 51, the axes of rotation of which are perpendicular to the axis of the crowns 1, said guide pulleys 51 being arranged in the vicinity of the retaining means 3. The presentation means 5 also comprise an orifice 53 conducting said thread 4 substantially in the plane of and within the loop formed by the belt 55.

10 Claims, 6 Drawing Sheets

COMPONENT ELEMENTS OF AN APPARATUS FOR THE MANUFACTURE OF A TIRE REINFORCEMENT

BACKGROUND OF THE INVENTION

The present invention relates to the manufacture of tires, and more particularly, to the type of apparatus described in U.S. Pat. Nos. 4,795,523 and 4,801,344.

Such an apparatus is intended for the manufacture of reinforcements for tires from a single thread. Among its essential elements, this apparatus comprises means for the retention of the thread, which means are borne by levers referred to in the above patents by the expression "support arms". This apparatus also comprises means for presenting the thread to the retaining means. In the examples described, these presentation means are formed of a rotary arm which assures the unwinding and the hooking of the thread to the retaining means; the thread-retaining means are formed of a pair of hooks and the unwinding of the thread is assured from an orifice located at the end of the rotary arm.

The object of the present invention is to propose other novel means for presenting the thread to the retaining means.

According to the invention, the apparatus for the manufacture of a tire reinforcement, said reinforcement being formed from a single thread, said apparatus being of the type comprising two coaxial crowns of levers, the ends of which bear means for the retaining of the thread, and means for the presentation of the thread to the retaining means, is characterized by the fact that said presentation means have a presentation head which is hooked to and carried by an endless flexible strand, said strand being mounted on at least two guide wheels, the axes of rotation of which are perpendicular to the axis of the crowns, said wheels being arranged in the vicinity of the retaining means, and by the fact that the presentation means have an orifice which conducts said thread substantially in the plane of said strand.

For an understanding of the principle of manufacture used in the present invention, as well as the apparatus in which the invention is used, reference may be made to the U.S. patents referred to above, as well as for a description of all the means which are not specific to the present.

DESCRIPTION OF THE DRAWINGS

The following figures will provide a better understanding of the present invention.

DETAILED DESCRIPTION OF INVENTION

Figure 1:
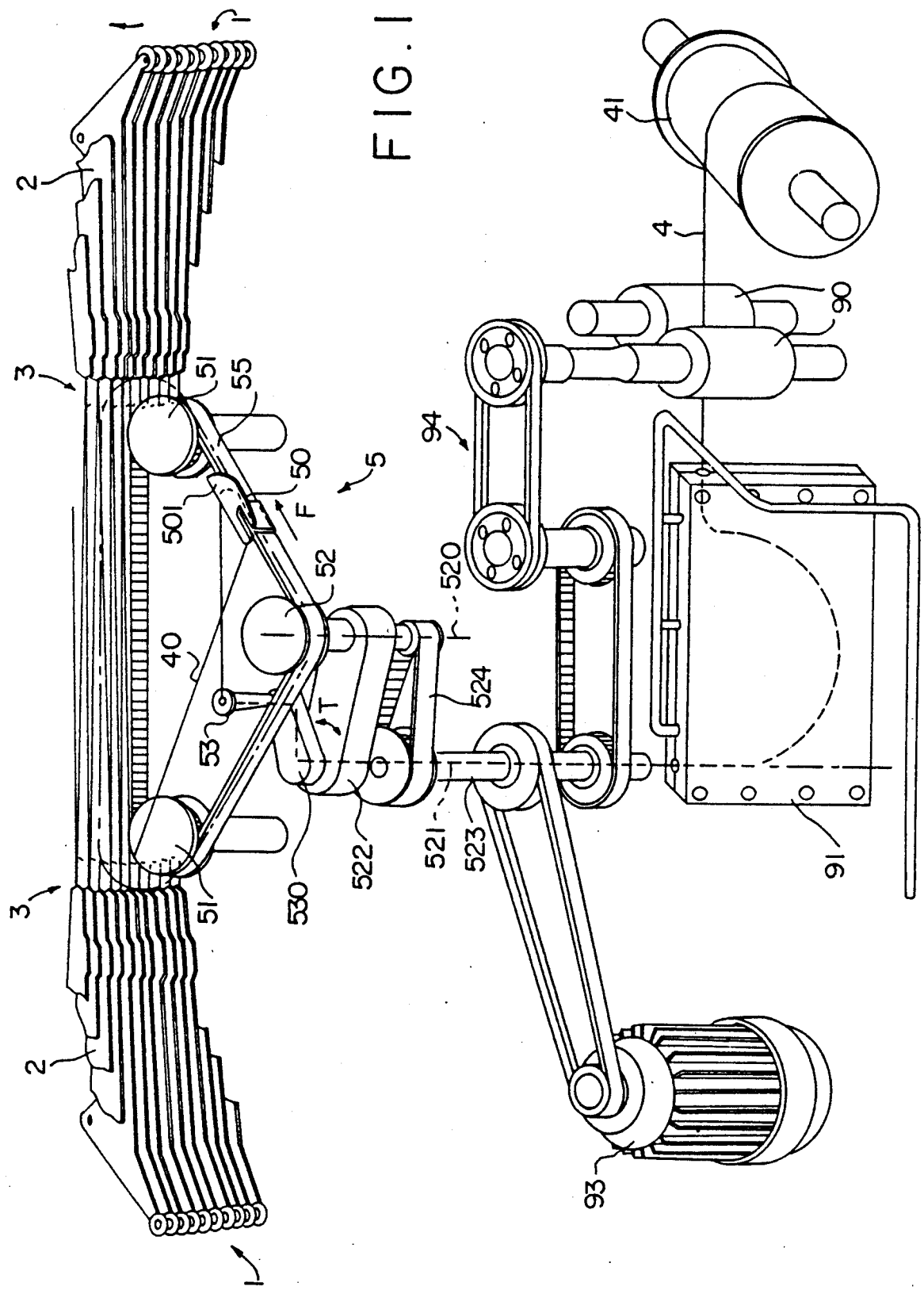
FIG. 1 shows the general layout of the presentation means on an apparatus of the type in question.
Figure 2:
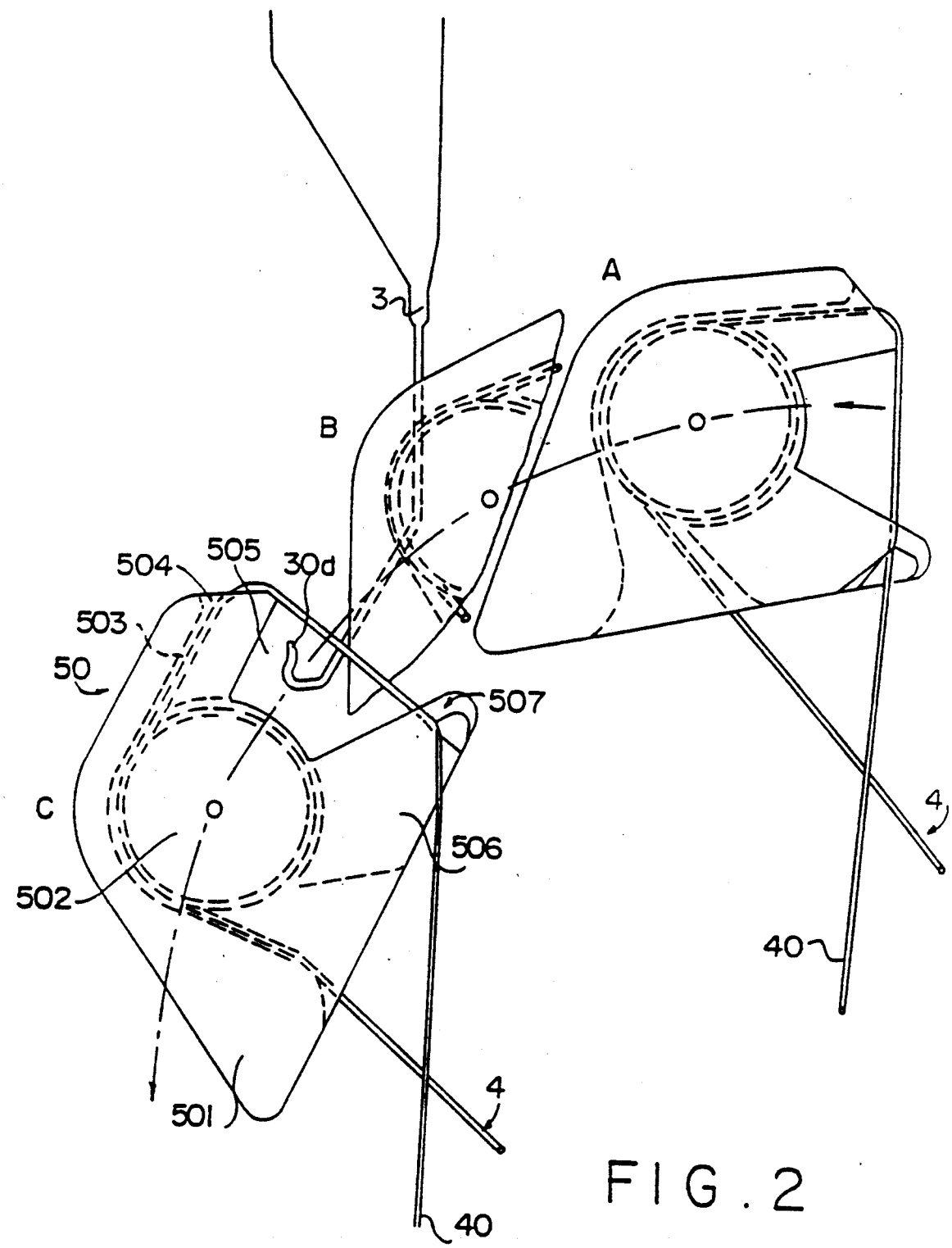
FIGS. 2 and 3 show in detail the interaction between presentation means and retaining means in the case of the crowns shown to the right in FIG. 1.

In FIG. 1, following the path of the thread 4, there is a bobbin 41 bearing the thread 4 followed by two rollers 90 which impose the speed of unwinding of the thread 4, said speed corresponding to the average consumption of thread 4. There is then a length-compensation system 91 which assures substantially constant tension of the thread. The means for the unwinding of the thread 4 and the means for hooking to the retention means are together driven by a single motor 93 and by suitable kinematic chains 94.

The thread 4 extends to the presentation means 5 which hook it to the retaining means, in the present case hooks 3, borne by levers 2 arranged in two crowns 1.

The presentation means comprise a presentation head 50. In order to control the movement of the presentation head 50, use is made of a flexible carrier or strand which can transmit the required movement, for instance a belt 55 which is notched in order to assure perfect synchronization between the movement of the presentation means 3 and the rotation of the two crowns 1. In general, the flexible strand should have sufficient torsional strength to contain the swinging caused by the presentation head 50 (more precisely by the action of the thread 4 on the presentation head 50) within tolerable limits. One could use two cables in parallel, mounted a sufficient distance apart. A chain could also be used.

The belt 55 carries a presentation head 50 through which there passes a thread 4 coming from a feed point consisting of an orifice 53. The notched belt 55 is mounted on two guide pulleys 51 which serve as guide wheels for the notched belt to move it in a complete loop in the same direction F. Said guide pulleys 51 are arranged in the vicinity of the hooks 3 so that the presentation head 50, which is a flat, thin part, can pass between two adjacent hooks 3. As the levers 2 which support the hooks 3 are arranged in a plane passing through the axis of said crowns 1, the presentation members are so arranged that the presentation head 50 itself is arranged substantially on the bisector of the adjacent two hooks 3 which are moved apart by the said presentation head 50 upon its passage. These considerations dictate the orientation of the guide pulleys 51, the axes of which are perpendicular to the axis of the crowns 1.

The advantage of this arrangement as compared with the rotary arm described in the aforementioned patents resides in the smaller amount of space required in order to permit the movement, particularly in the case of substantial distances between hooks 3. The presentation members 5 with belt 55 which are described here penetrate only very slightly within the theoretical cylinder surrounding the retention means, that is to say, the cylinder formed by the thread 4 when it is hooked to all the hooks 3. Therefore the rigid core on and around which the reinforcement threads 4 acts may already be in its central position between the crowns while the phase of hooking to the retention means is carried out.

If it is desired that the apparatus constructed be able to manufacture several different sizes of tires, or more precisely, tires requiring different lengths of thread 4 from one bead wire to the other, it is necessary that one be able to vary the distance between the two crowns 1, and therefore the distance between the two guide pulleys 51. In this case, the belt 55 is mounted also on one or more tension pulleys 52 which one can move toward the axis of the crowns or away from it, depending on whether the distance between guide pulleys 51 is to be increased or decreased.

In FIG. 1 it is seen that the tension pulley 52 is motorized and imparts the movement to the belt 55. In order to assure the necessary tension of said belt 55, the shaft 520 of the tension pulley 52 can turn around an axis 521. The tensioning movement is imparted by the arm 522 which turns around the axis 521 to control the displacement of the axis 520 (arrow T). The tension pulley 52 is driven in rotation by shaft 523 mounted in the axis 521 by a drive belt 524. The shaft 523, in its turn, is driven by the motor 93.

The thread 4 is delivered through an orifice 53. In order to avoid crossing over of threads 4 in the reinforcement (tire carcass) which is finally produced, this orifice 53 must be located within the loop formed by the belt 55. The strand 40 of thread 4, which appears between a hook 3 of the left-hand crown 1 in FIG. 1 and the presentation head 50, must be permitted to pass above the orifice 53, which is therefore arranged approximately in the plane of the loop formed by the belt 55, below the presentation head 50.

It should be noted that the presentation head 50 is offset laterally with respect to the belt 55, that is to say, neither toward the inside of the loop nor toward the outside of the loop but adjacent and above one of its sides, namely the upper side in FIG. 1. On this side of the belt 55, the head 50 passes above the pulleys 51 and 52. Within the zone swept by the presentation head 50, the space should not contain any obstacles other than the hooks 3 to which the thread 4 is presented in order to be hooked there.

The orifice 53 is mounted on a rod 530 for rotation around the axis 521 and perpendicular to said rod 530. The rod 530 and the arm 522 form a constant angle. The thread 4 moves from the length-compensation system 91 up to the said rod 530 precisely along the axis 521 and therefore within the shaft 523.

This special arrangement, namely, the mechanical combination of the orifice 53 and the arm 522 which adjusts with the movement of the axis of the tension pulley 52, is not necessary but it has been observed that this minimizes the length of thread 4 which the compensation system 91 must necessarily take up at a moment of the cycle passed through by the presentation means, and this whatever the adjustment of the distance between the guide pulleys 51.

Figure 6:
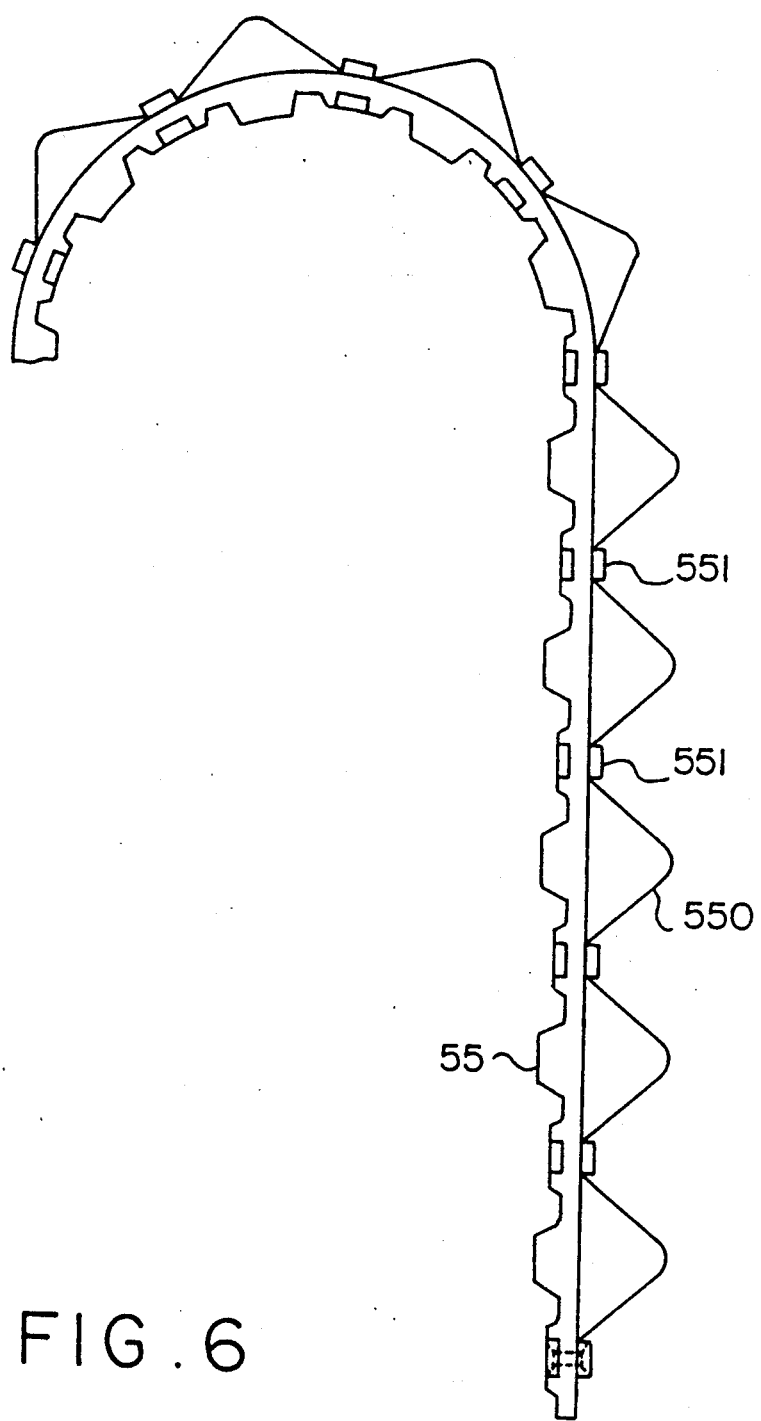
FIG. 6 shows a stiffening for a component of the presentation means.

FIG. 6 shows a variant embodiment of the belt 55. The latter is reinforced by a strap 550 folded in zig-zag shape, hooked to the belt locally by its points 551. The twisting of the belt 55 around its center fiber is limited thereby without jeopardizing the winding thereof around the pulleys 51, 52. Even if such reinforcement is desirable, it is not necessary to make the entire length of the belt 55 rigid; a length corresponding to the maximum possible distance between the guide pulleys 52 is sufficient since this corresponds to the longest path along which the belt 55 is not supported. In any event, the presentation head 50 is always firmly held at the time that it is to cooperate with the hooks 3 since there are guide pulleys 52 so that, at this time, the presentation head 50 passes over said guide pulleys 52.

The detailed embodiment of the laying head 50 and even more that of the hooks 3 depend on the type of thread 4 used, the expression "thread" being used in its most general sense, namely, a single filament or cabled thread. The detailed development of the hooks 3 also depends on the type of thread 4 used and, even more, on the type of anchoring of the reinforcement in the future tire. It is, therefore, necessary to bear in mind that the following description contains further information dictated by the nonlimitative use of rayon thread 4 to produce a radial carcass reinforcement for a passenger-car tire.

The presentation head 50 has, from front to rear with reference to the displacement thereof imposed by the belt 55 and indicated symbolically by "F" in FIG. 1, a point 501, a return pulley 502, a nozzle 503 which moves the end 504 where the thread 4 is freed from the presentation head 50, away from the said return pulley 502. In this way, a recess 505 is created between the return pulley 502 and the strand 40 of the thread 4 as it leaves the presentation head 50. (See FIGS. 2 to 5).

Figure 3A:
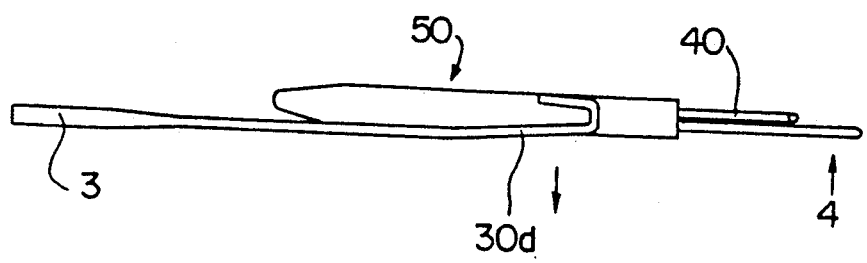
Figure 3B:
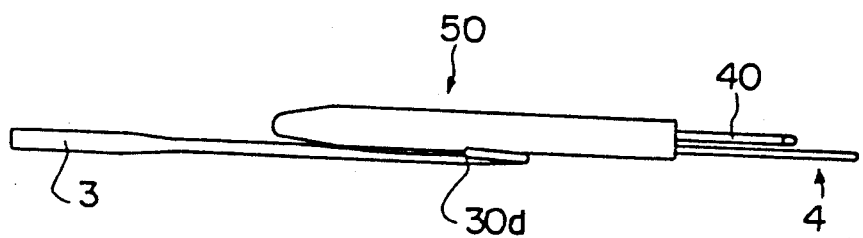
Figure 3C:
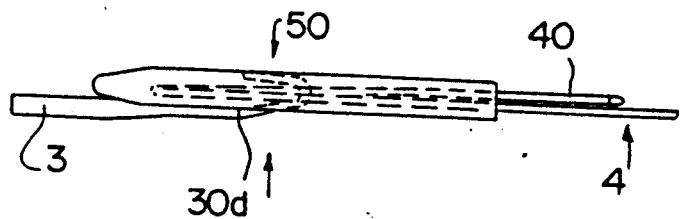

In order to present the thread 4 to the hooks 3, the presentation head 50 penetrates into the inside of the cylinder defined by the group of hooks 3 of the two crowns, in the case of the right-hand crown 1 in FIG. 1 while it emerges from the same cylinder in the case of the left-hand crown 1. The head 50 passes between the last hook 3 on which the thread 4 has been hooked upon the preceding rotation of the belt 55 and the first hook 3 which is still free, namely to the right-hand crown 1, while the said head 50 passes between the first two hooks 3 which are still free to the left-hand crown 1. These structural choices dictate the precise shape of the hooks 3 and of the head 50. Thus the head 50 has a protuberance 506 which supports a notch 507 in order, on the side of the right-hand crown 1, better to move the strand 40 away from the return pulley 502. The role of this arrangement is clearly evident in FIG. 2, which shows the configuration of the head 50 with respect to a hook 3 in three successive stages A, B, C. FIG. 3 corresponds to FIG. 2 and shows another view of the same three successive stages A, B, C. After passing from A to B it is seen that the head 50 lowers the end 30d of the hook 3 since said end is raised, in C, behind the head 50 and penetrates into the recess 505 in order to hook the thread 4.

Figure 4:
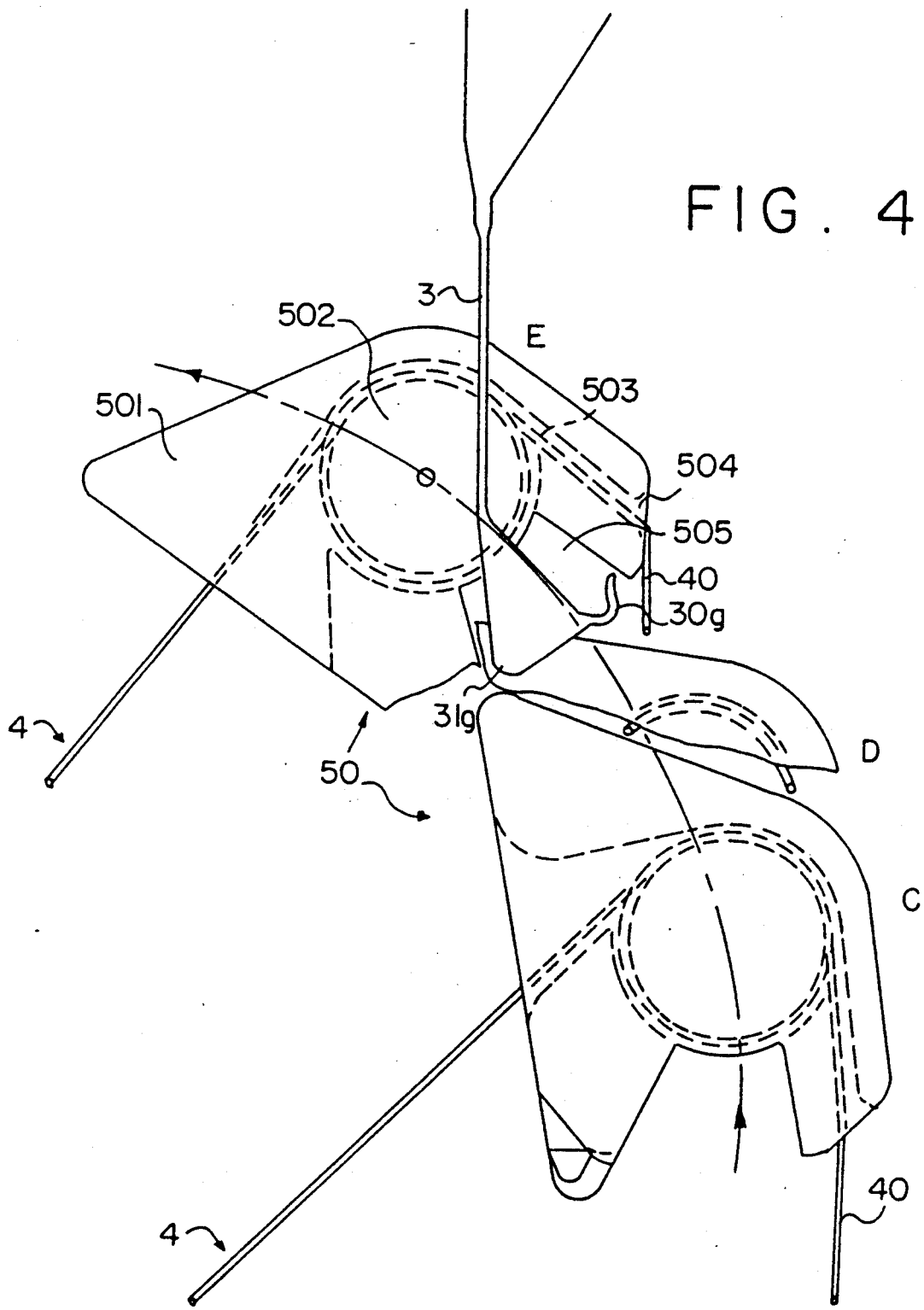
FIGS. 4 and 5 show the same detail for the crown shown to the left in FIG. 1.
Figure 5C:
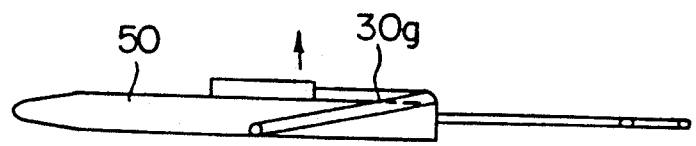
Figure 5D:
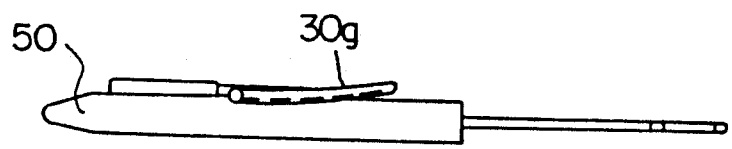
Figure 5E:
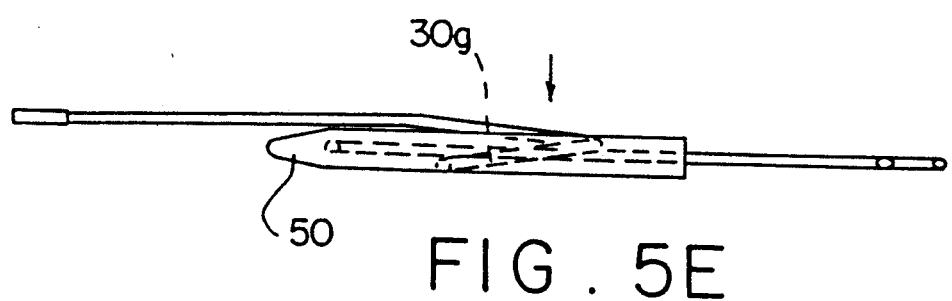

The hooking of the left side is described with reference to FIGS. 4 and 5. They also show three successive stages C, D, E: in similar manner, the head first of all moves away the end 30g of the hook 3 (C → D) by progressive pushing due to the lug 31g, whereupon the said end 30g penetrates into the recess 505 where it can hook and retain the thread 4 which is carried along by the head 50.

The retaining means described comprise a single hook 3 per lever 2 since the apparatus described is designed to produce a turning of the threads 4 upon a bead wire. The apparatus is used in accordance with the following procedure: The thread 4 having been hooked to all the hooks 3, forming twice as many lengths of thread 4 as there are hooks 3 in a crown 1, all these lengths are place don and around a core until the said hooks are in a radial position which is at least slightly less than the radius of turn around the future bead wire and then, on both sides of the core axially outside the threads, there is installed a bead wire, whereupon the hooks 3 are raised while displacing the bead wires axially toward the core and maintaining the threads 4 under tension until the assembly, that is to say the bead wires and the hooks 3 holding the threads 4, is applied against the core.

It is advantageous to effect an "upward" turn-over, that is to say, one which brings the ends of the lengths of thread 4 which are supported by the hooks 3 above the shoulders of the future tire, and therefore below the tread. In this way, the number of retaining means required and therefore of levers 2 required is divided by two for a given number of threads 4 present in each sidewall, which number is dictated by the mechanical strength which must be imparted to the tire. In this case, to be sure, the length of each length of thread 4 is so much larger and therefore the initial distance between the two crowns 1 of holding means is very large. The presentation means described accommodate themselves excellently to a very large distance between the crowns.

The invention has been shown and described in preferred forms, and obviously many modifications and variations are possible within the spirit of the invention.

I claim:

1. An apparatus for the manufacture of a reinforcement for tires, said reinforcement being formed from a single thread, said apparatus having two circular arrays (1) of levers (2), the axially inner ends of which have means (3) for retaining the thread, and presentation means (5) for presenting the thread (4) to said retaining means (3), characterized by the fact that said presentation mans (5) have a presentation head (50) carried in a closed loop by an endless flexible strand, such that the thread is presented to opposite retaining means by movement of said strand in a complete loop in the same direction (F), said strand being mounted for movement on at least two guide wheels, the axes of rotation of which are perpendicular to the axis of the circular arrays of levers, said guide wheels being arranged in the vicinity of the retaining means (3), by the fact that said presentation means include a feed orifice (53) for receiving the thread from a source and conducting said thread to the presentation head substantially in the plane of said strand and by the fact that the presentation head is offset laterally with respect to the plane of said strand.

2. An apparatus according to claim 1, characterized by the fact that said strand is also mounted on a tension pulley (52) which makes it possible to vary the distance between the guide wheels.

3. An apparatus according to claim 1 or 2, characterized by the fact that said strand is a notched belt (55).

4. An apparatus according to claim 1, characterized by the fact that said head (50) comprises, from front to rear with reference to the displacement thereof by said strand, a leading end (501), a trailing end (504), a return pulley (502) intermediate the leading and trailing ends, and a nozzle (503) through which the thread passes in moving from the pulley before discharge from the trailing end and further characterized by the fact that a recess (505) is formed between the return pulley (502) and the portion (40) of the thread (4) leaving the presentation head (50).

5. An apparatus according to any of claims 1, 2 or 4, characterized by the fact that the said feed orifice (53) of the thread is located on the inside of said loop.

6. An apparatus according to claim 3, characterized by the fact that the notched belt (55) is reinforced in advance of and behind the head (50) over a length corresponding to at least the distance between the guide pulleys (51).

7. An apparatus according to claim 6, characterized by the fact that the notched belt (55) is reinforced by a strap which is folded in zig-zag shape.

8. An apparatus for the manufacture of a cylindrical reinforcement for a tire, said cylindrical reinforcement being formed from a continuous thread looped between two circular arrays of cord retention means, comprising a flexible carrier guided for movement in closed path between the retention means of the two circular arrays, a presentation head transported by the movement of the carrier in a complete loop in the same direction to deliver the thread to retention means of one circular array and then to opposite retention means of the other circular array to construct the cylindrical reinforcement, and a thread dispensing means for discharging the thread within the closed path of the carrier to the presentation head.

9. An apparatus as set forth in claim 8, including a pair of guide means for the carrier, one guide means being arranged to guide the presentation head in operative relationship with one retention means and the other guide means being arranged to guide the presentation head in operative relationship with an opposite retention means, the distance between said pair of guide means being adjustable for the distance between the opposite retention means and an additional adjustable guide means for the carrier for adjusting said adjustable guide means in relation to said pair of guide means to make it possible to vary the distance between said pair of guide means while maintaining tension on the carrier.

10. An apparatus as set forth in claim 8, in which said carrier is guided by said guide means in a plane and said presentation head is transported by said carrier laterally offset from said plane.

* * * * *